United States Patent
Jun et al.

(10) Patent No.: US 8,456,596 B2
(45) Date of Patent: Jun. 4, 2013

(54) TRANSPARENT DISPLAY DEVICE AND DISPLAYING METHOD USING THE SAME

(75) Inventors: Tae-Jong Jun, Suwon-si (KR); Jong-Seo Lee, Hwaseong-si (KR); Woo-Young Cheon, Yongin-si (KR); Joo-Young Lee, Seoul (KR); Soo-Lin Kim, Seoul (KR); Jung-Suk Han, Hwaseong-si (KR)

(73) Assignee: Samsung Display Co., Ltd., Yongin (KR)

( * ) Notice: Subject to any disclaimer, the term of this patent is extended or adjusted under 35 U.S.C. 154(b) by 268 days.

(21) Appl. No.: 12/956,734

(22) Filed: Nov. 30, 2010

(65) Prior Publication Data
US 2012/0038868 A1 Feb. 16, 2012

(30) Foreign Application Priority Data
Aug. 10, 2010 (KR) .................. 10-2010-0076962

(51) Int. Cl.
*G02F 1/1335* (2006.01)
(52) U.S. Cl.
USPC .......................... 349/114; 349/113

(58) Field of Classification Search
USPC .................................... 349/114, 113
See application file for complete search history.

(56) References Cited

U.S. PATENT DOCUMENTS 6,636,277 B2   10/2003  Eberhardt et al.
2004/0165060 A1*  8/2004  McNelley et al. ......... 348/14.08

FOREIGN PATENT DOCUMENTS

| JP | 07-077953 |   | 3/1995 |
| JP | 08-179312 |   | 7/1996 |
| JP | 08179312 A | * | 7/1996 |
| JP | 11-271665 |   | 10/1999 |

\* cited by examiner

*Primary Examiner* — Mike Qi
(74) *Attorney, Agent, or Firm* — H.C. Park & Associates, PLC

(57) ABSTRACT

A transparent display device includes a liquid crystal display (LCD) module and a transparent reflector. The LCD module includes an LCD panel having a liquid crystal layer, a light source providing light to the LCD panel, and a polarizing plate disposed between the light source and the LCD panel to polarize light from the light source. The transparent reflector and the LCD module are spaced apart. The transparent reflector displays the image by reflecting the image provided from the LCD panel. The transparency of the transparent reflector may be controlled, and the transparent reflector may have a curved shape.

22 Claims, 5 Drawing Sheets

TRANSPARENT DISPLAY DEVICE AND DISPLAYING METHOD USING THE SAME

CROSS REFERENCE TO RELATED APPLICATION

This application claims priority from and the benefit of Korean Patent Application No. 2010-0076962, filed on Aug. 10, 2010, which is hereby incorporated by reference for all purposes as if fully set forth herein.

BACKGROUND OF THE INVENTION

1. Field of the Invention

Exemplary embodiments of the present invention relate to a transparent display device and a display method using the transparent display device. More particularly, exemplary embodiments of the present invention relate to a transparent display device that may improve dramatic effects of a transparent display and a display method using the transparent display device.

2. Discussion of the Background

Recently, a transparent display technology has been used. The transparent display technology creates dramatic effects by combining an image and a real object in various settings such as an exhibition, a magic show, a launching show, and other settings.

In the transparent display technology, the image is displayed as suspended in the air and generally requires disposal of a liquid crystal display (LCD) panel on a surface with arrangement of an acrylic plate situated obliquely above the front surface of the LCD panel. The acrylic plate displays an image by reflecting light transmitted by the LCD panel.

However, since an imperfectly transparent acrylic sheet is used to display the image, dramatic effects of a truly transparent display tend to be diminished. Also, the LCD panel must be hidden from audiences.

Therefore, this type of transparent display technology may find use in limited situations.

SUMMARY OF THE INVENTION

Exemplary embodiments of the present invention provide a transparent display device that may improve dramatic effects of the transparent display, enhanced use of space, and improved design freedom.

Additional features of the invention will be set forth in the description which follows and, in part, will be apparent from the description or may be learned by practice of the invention.

An exemplary embodiment of the present invention discloses a display device that comprises a liquid crystal display (LCD) module. The LCD module comprises an LCD panel comprising a liquid crystal layer, a light source to provide light to the LCD panel, and a polarizing plate disposed between the light source and the LCD panel to polarize the light from the light source. The display device also comprises a reflector spaced apart from the LCD module and configured to reflect an image provided from the LCD panel, and a transparency of the reflector is controllable.

An exemplary embodiment of the present invention also discloses a display device that comprises a liquid crystal display (LCD) module. The LCD module comprises an LCD panel comprising a liquid crystal layer, a light source to provide light to the LCD panel, and a polarizing plate disposed between the light source and the LCD panel to polarize the light. The display device also comprises a reflector spaced apart from the LCD module and configured to reflect an image provided from the LCD panel, and the reflector has a curved shape.

An exemplary embodiment of the present invention additionally discloses method for displaying an image that comprises providing polarized light to a liquid crystal display (LCD) panel and displaying an image provided from the LCD panel by reflecting the image from a transparent reflector spaced apart from the LCD panel.

An exemplary embodiment of the present invention further discloses an image display apparatus that comprises an image display device and a reflector spaced apart from the image display device and configured to polarize and reflect light transmitted from the image display device to display an image.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
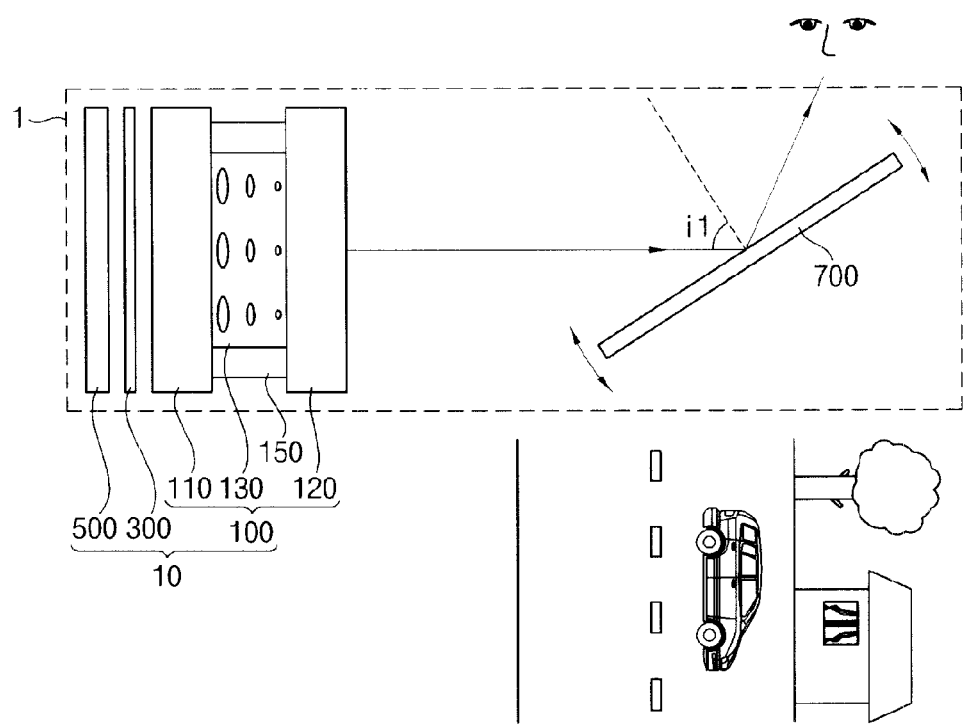
FIG. 1 is a cross-sectional view of a transparent display device according to an exemplary embodiment of the present invention.

The invention is described more fully hereinafter with reference to the accompanying drawings in which embodiments of the invention are shown. This invention may, however, be embodied in many different forms and should not be construed as limited to the embodiments set forth herein. Rather, these embodiments are provided so that this disclosure is thorough and will fully convey the scope of the invention to those skilled in the art. In the is drawings, the size and relative sizes of layers and regions may be exaggerated for clarity. Like reference numerals in the drawings denote like elements.

It will be understood that when an element or layer is referred to as being "on," "connected to," or "coupled to" another element or layer, it can be directly on, directly connected to, directly coupled to the other element or layer, or intervening elements or layers may be present. In contrast, when an element is referred to as being "directly on,"

"directly connected to," or "directly coupled to" another element or layer, there are no intervening elements or layers present.

The term "transparent" refers to the quality of a material for transmission of one or more frequencies of radiation. The percentage of transmission may range from 0% to 100% of the incident radiation. The radiation may be in the visible range but may not be limited to just visible wavelengths of light.

FIG. 1 is a cross-sectional view of a transparent display device according to an exemplary embodiment of the present invention.

Referring to FIG. 1, the transparent display device 1 includes a liquid crystal display (LCD) module 10 and a transparent reflector 700 spaced apart from the LCD module 10.

The LCD module 10 includes an LCD panel 100 including a first substrate 110, a second substrate 120, a liquid crystal layer 130, a polarizing plate 300 disposed under the LCD panel 100, and a light source 500 providing light to the LCD panel 100.

The first substrate 110 may be a thin-film transistor (TFT) substrate on which a pixel layer (not shown) and a pixel electrode (not shown) are formed.

The second substrate 120 may be a color filter substrate including a color filter that imparts a color to transmitted light and a common electrode (not shown) opposite to the pixel electrode of the first substrate 110. Alternatively, the color filter may be formed on the first substrate 110 instead of the second substrate 120.

The pixel electrode and the common electrode may include a transparent conductive material to transmit externally provided light. For example, the pixel electrode and the common electrode may include materials such as indium tin oxide (ITO), indium zinc oxide (IZO), and tin oxide (TO).

A sealant 150 maintains the liquid crystal layer 130 between the first substrate 110 and the second substrate 120. The liquid crystal layer 130 may have regularly arranged liquid crystals with optical and electrical characteristics that may include an anisotropic refractive index, an anisotropic permittivity, and similar properties. In the liquid crystal layer 130, an arrangement of the liquid crystals may vary in response to the strength of an electric field between the pixel electrode and the common electrode to control light transmission via variation of the arrangement, i.e., directions of molecular axes of the liquid crystals.

The liquid crystal layer 130 may be driven by a vertical switching method such as a vertical alignment (VA) mode, an electrically controlled birefringence (ECB) mode, and an optically compensated birefringence (OCB) mode. Alternatively, the liquid crystal layer 130 may be driven by a horizontal switching method such as an in-plane switching (IPS) mode and a fringe-field switching (FFS) mode. Alternatively, the liquid crystal layer 130 may be driven by a switching method using the twist of an ensemble of liquid crystal molecules such as in a twisted nematic (TN) mode and a super twisted nematic (STN) mode.

Regarding the polarizing plate 300, the polarizing plate 300 may be disposed on an outer surface of the first substrate 110. The polarizing plate 300 transmits light whose electric field vector oscillates in a direction parallel to the polarization axis of the polarizing plate 300 material while not transmitting light having an electric field vector that oscillates in a direction perpendicular to the polarization axes of the polarizing plate 300 material. Therefore, the polarizing plate 300 effectively filters polarization of incident light from the light source 500. The polarizing plate 300 may adhere to the first substrate 110 by an adhesive or an adhesive tape (not shown).

The light from the light source 500 is provided to the LCD panel 100 through the polarizing plate 300. However, the LCD module 10 does not include a polarizing plate disposed on the LCD panel 100 on the surface opposite to the light source 500, i.e., between the LCD panel 100 and the transparent reflector 700. Therefore, the LCD module 10 does not display an image, but, instead displays a distribution of white light over the surface of the second substrate 120. Consequently, when the image is provided to the LCD module 10, the LCD panel 100 does not display colors but displays white light according to a luminance of the light source 500 or a grayscale of the image.

In the present exemplary embodiment, the light source 500 may produce light of various polarizations. Polarizing plate 300 transmits light having only a certain polarization. As the light subsequently passes through the liquid crystal layer 130, the light interacts with the liquid crystal molecules so that light transmitted through individual pixels acquires a polarization that depends on the orientation of the liquid crystal molecules within individual pixels. The second substrate transmits the resulting white light, which may have a plurality of polarizations. The light travels from the LCD module to the transparent reflector 700.

The transparent reflector 700 and LCD module 10 are spaced apart, and the transparent reflector 700 displays the image from the LCD module 10 by reflection. The transparent reflector 700 generates reflected light by polarizing the light provided from the LCD module 10. Therefore, the transparent reflector 700 acts as a polarizing plate disposed on the LCD panel 100 even though the LCD module 10 is spaced from the transparent reflector 700.

To achieve these effects, the transparent reflector 700 is disposed in a range of distances from the LCD module 10 to receive light from the LCD module 10. In addition, the transparent reflector 700 is positioned so that the light incidence angle i1 of the transparent reflector 700 of light from the LCD module 10 may range from more than about 0° but less than about 90°, i.e., from between slightly less than normal to slightly greater than parallel to the surface of the transparent reflector 700. For example, the incidence angle i1 may be more than 10° but less than 80°. Particularly, when the incidence angle i1 is at Brewster's angle, the brightest image may be displayed, that is, $i1=\tan^{-1} \eta$, where $\eta$ is the refractive index of the medium of the transparent reflector 700 with the refractive index of air taken to be approximately one.

An angle of the transparent reflector 700 may be controlled according to the incidence angle i1 of the light or a viewing angle of observers.

The transparent reflector 700 may be formed from a transparent material having a refractive index greater than about 1. For example, the transparent reflector 700 may include materials such as glass, acrylic, polycarbonate, and a combination thereof. Therefore, as shown in FIG. 1, observers may see an overlap of the reflected image displayed on the transparent reflector 700 and real objects such as a background, a person, an object, or the like that are located behind the transparent reflector 700.

The transparency of the transparent reflector 700 may be controlled according to the luminance of the light source 500 or the grayscale of the image. The LCD module 10 may further include a control part (not shown) that detects an intensity of an external light and controls the transparency of the transparent reflector 700 based on the detected intensity of the external light. The real objects such as the background, the person, the object, or the like behind the transparent reflector 700 may be clearly shown or may not be shown according to the transparency of the transparent reflector 700.

The transparent reflector 700 may have a curved shape. When the transparent reflector 700 has a curved shape with a constant curvature, the image may be diminishingly or expansively displayed on the transparent reflector 700. For example, when the transparent reflector 700 has a concave shape with respect to the LCD module 10, the image may be expansively displayed, i.e., the reflected image may be enlarged with respect to the size of the incident image from the LCD panel 100. When the transparent reflector 700 has a convex shape with respect to the LCD module 10, the image may be diminishingly displayed, i.e., the reflected image may be reduced with respect to the size of the incident image from the LCD panel 100.

The transparent reflector 700 inversely may display the image in left-and-right or up-and-down directions, and the control part may compensate a distortion of the image due to an image inversion. Further, the control part may provide an inverse image of the image displayed on the transparent reflector 700 to the LCD module 10. Furthermore, the control part may compensate the distortion of the image due to an expansion or a reduction of the image.

According to the present exemplary embodiment, the LCD module 10 does not display the image but displays transmitted white light having a polarization according to an on or off status of individual pixels. Thus, there is no need to hide the LCD module 10 for dramatic effects, and the LCD module 10 may be used as a light or a stage setting. In addition, the transparent reflector 700 is spaced apart from the LCD module 10 so space usage may be optimized. Further, the transparent reflector 700 does not need a bezel so its design may be free.

Figure 2:
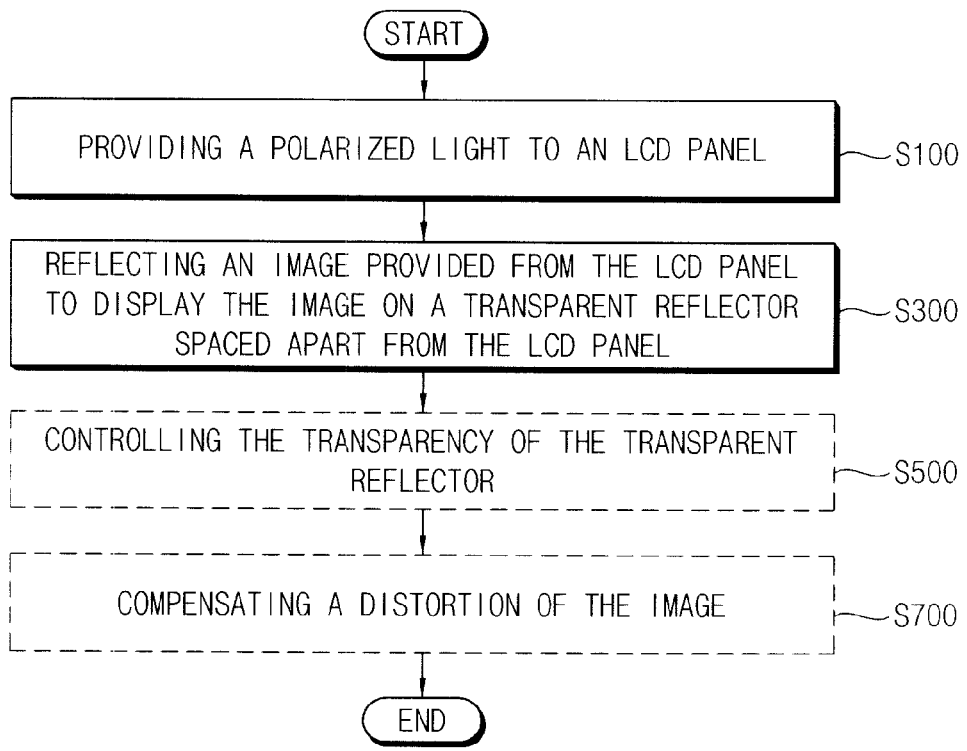
FIG. 2 is a flow chart showing representative steps in a display method using the transparent display device shown in of FIG. 1.

FIG. 2 is a flow chart of steps in a display method using the transparent display device shown in FIG. 1.

Referring to FIG. 1 and FIG. 2, in the method of using a transparent display, a polarized light is provided to the LCD panel 100 (step S100). For example, the light is provided by the light source 500 and polarized by the polarizing plate 300 disposed under the LCD panel 100. However, the LCD module 10 does not include a polarizing plate disposed on the side of LCD panel 100 opposite to the light source 500 so the LCD module 10 cannot directly display the image. Therefore, when the image is provided to the LCD module 10, the LCD panel 100 does not display colors but, instead, displays white light having an intensity corresponding to the luminance of the light source 500 or the grayscale of the image.

The LCD panel 100 provides polarized light to the transparent reflector 700 spaced apart from the LCD panel 100. The transparent reflector 700 displays the image provided from the LCD panel 100 by reflecting the image from the LCD module 10 (step S300).

The transparent reflector 700 may have a curved shape with a constant curvature. When the transparent reflector 700 has a curved shape, the image provided from the LCD module 10 may be diminishingly or expansively displayed on the transparent reflector 700.

The transparent reflector 700 may have a concave shape or a convex shape with respect to the surface of the LCD module 10 that faces the transparent reflector 700. For example, when the transparent reflector 700 has a concave shape, the reflected image may be enlarged as compared with the incident image from the LCD panel 100. Similarly, when the transparent reflector 700 has a convex shape, the reflected image may be reduced as compared with the incident image from the LCD panel 100.

The transparent reflector 700 may be positioned in a range of distances from the LCD module 10. In addition, the transparent reflector 700 may be disposed such that an incidence angle i1 of light to the transparent reflector 700 from the LCD module 10 is more than about 0° but less than about 90°. For example, the incidence angle i1 may be more than about 10° but less than about 80°. Particularly, when the incidence angle i1 is at Brewster's angle, the displayed image may be brightest, that is, $i1=\tan^{-1} \eta$, where $\eta$ is the refractive index of the medium of the transparent reflector 700 with the refractive index of air approximated as one.

An angle of the transparent reflector 700 may be controlled according to the incidence angle i1 of the light or a viewing angle of observers.

The transparency of the transparent reflector 700 may be controlled according to the luminance of the light source 500 or the grayscale of the image (step S500). The LCD module 10 may further include a control part (not shown). The control part may detect the intensity of an external light and may control the transparency of the transparent reflector 700 based on the detected intensity of the external light.

In FIG. 2, the transparency of the transparent reflector 700 is controlled after the transparent reflector 700 displays the reflected image (step S300). Alternatively, the transparency of the transparent reflector 700 may be controlled before or after the image is provided to the LCD panel 100 or before the image is provided to the transparent reflector 700.

The transparent reflector 700 inversely displays the image in left-and-right or up-and-down directions, and the control part may compensate a distortion of the image due to an image inversion (step S700). Further, the control part may compensate the distortion of the image due to expansion or reduction of the image.

In FIG. 2, distortion of the image is compensated after the transparent reflector 700 displays the image by reflecting the image (step S300). Alternatively, the distortion of the image may be compensated before or after the image is provided to the LCD panel 100 or before the image is provided to the transparent reflector 700. Furthermore, the control part may provide an inverse image of the image displayed on the transparent reflector 700 to the LCD module 10.

Figure 3:
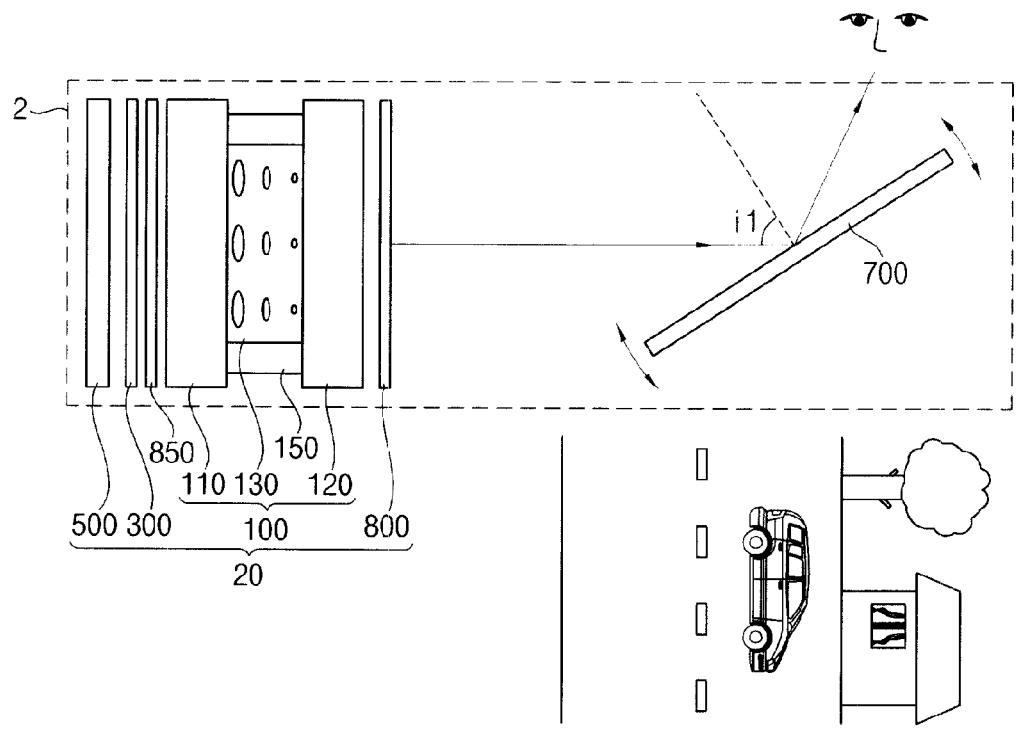
FIG. 3 is a cross-sectional view of a transparent display device according to another exemplary embodiment of the present invention.

FIG. 3 is a cross-sectional view of a transparent display device according to another exemplary embodiment of the present invention.

Referring to FIG. 3, the transparent display device 2 according to the present exemplary embodiment is substantially the same as the transparent display device 1 shown in FIG. 1 except for first and second optical sheets 800 and 850. Thus, the elements in FIG. 1 are referred to using the same reference numerals, and repeat descriptions of substantially similar elements are abbreviated or omitted. In addition, a method for a transparent display of the transparent display device 2 according to the present exemplary embodiment is substantially similar to the method shown in FIG. 2, and repeat descriptions thereof are abbreviated or omitted.

The transparent display device 2 includes an LCD module 20 and a transparent reflector 700 spaced apart from the LCD module 20. The LCD module 20 includes an LCD panel 100, a polarizing plate 300 disposed under the LCD panel 100, a light source 500 providing light to the LCD panel 100 through the second optical sheet 850, and a first optical sheet 800 disposed over the LCD panel 100.

In exemplary embodiments of the present invention, the LCD module 20 does not need a wide viewing angle but rather may concentrate light to the transparent reflector 700. The LCD module 20 does not display an image but functions as an image source providing the image to the transparent reflector 700.

The first optical sheet 800 is disposed over the LCD panel 100 and concentrates the light to the transparent reflector 700. For example, the first optical sheet 800 may include elements such as a light concentrating sheet or a prism sheet.

The LCD module 20 may further include the second optical sheet 850 disposed between the polarizing plate 300 and the LCD panel 100. The second optical sheet 850 may include a light concentrating sheet, a phase difference compensating film, a prism sheet, or a diffusing sheet and combinations thereof.

According to the present exemplary embodiment, the light provided from the LCD module 20 is concentrated to the transparent reflector 700 so a luminance of the transparent display device 2 may be increased.

Figure 4:
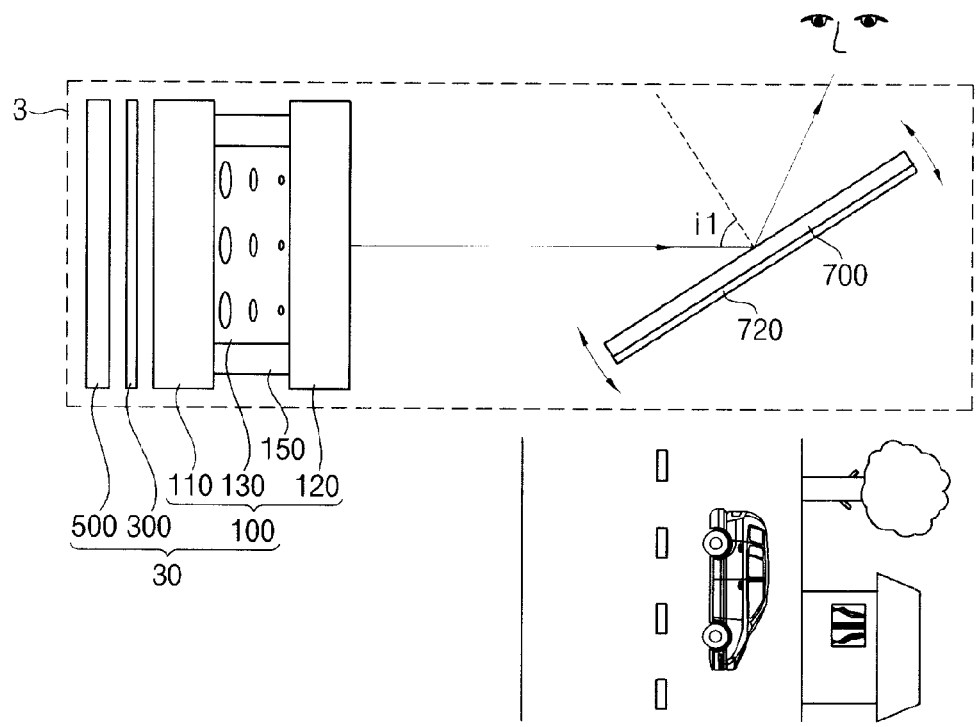
FIG. 4 is a cross-sectional view of a transparent display device according to another exemplary embodiment of the present invention.

FIG. 4 is a cross-sectional view of a transparent display device according to another exemplary embodiment of the present invention.

Referring to FIG. 4, the transparent display device 3 according to the present exemplary embodiment is substantially the same as the transparent display device 1 shown in FIG. 1 except for a reflective film 720. Thus, the elements shown in FIG. 4 that are substantially similar to those shown in FIG. 1 are referred to using the same reference numerals, and repeated descriptions are abbreviated or omitted. In addition, a method of using the transparent display of the transparent display device 3 according to the present exemplary embodiment is substantially similar to the method of FIG. 2, and repeated descriptions are abbreviated or omitted.

The transparent display device 3 includes an LCD module 30 and a transparent reflector 700 on which the reflective film 720 is disposed. The LCD module 30 includes an LCD panel 100, a polarizing plate 300 disposed under the LCD panel 100, and a light source 500 providing light to the LCD panel 100. The transparent reflector 700 and the LCD module 30 are spaced apart.

In exemplary embodiments of the present invention, the reflective film 720 may be formed on a surface of the transparent reflector 700 opposite to the surface where the image is displayed. The reflective film 720 may be attached to the surface of the transparent reflector 700 or may be formed on the surface of the transparent reflector 700 by coating the transparent reflector 700 with a reflective material.

The reflective film 720 reflects light from the LCD module 30 and blocks the light from being transmitted through the transparent reflector 700. Therefore, the image may not be shown on the surface of the transparent reflector 700 opposite to the surface on which the image is displayed, i.e., the surface of the transparent reflector opposite to an observer.

According to the present exemplary embodiment, the image is only displayed on one surface of the transparent reflector 700, so that security of the transparent display device 3 may be increased.

Figure 5:
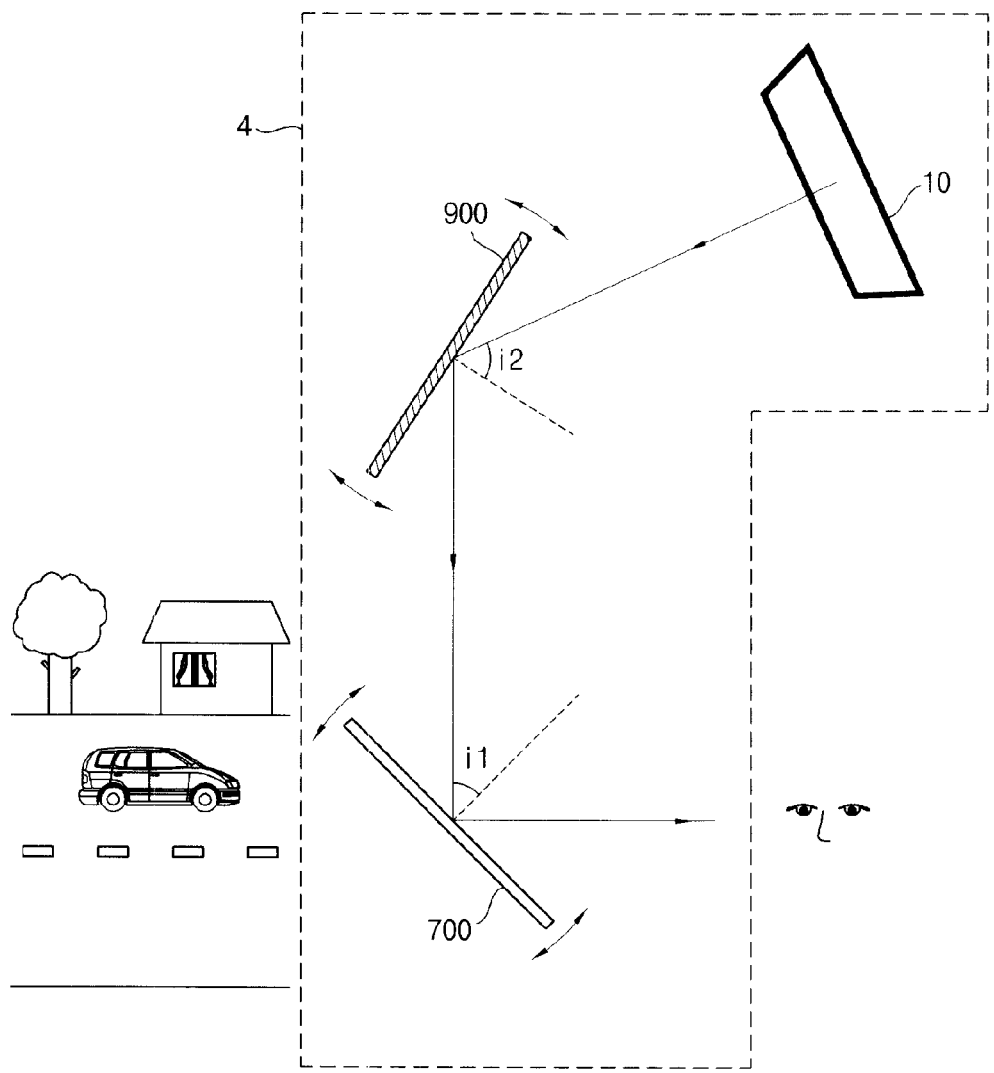
FIG. 5 is a cross-sectional view of a transparent display device according to another exemplary embodiment of the present invention.

FIG. 5 is a cross-sectional view of a transparent display device according to another exemplary embodiment of the present invention.

Referring to FIG. 5, the transparent display device 4 according to the present exemplary embodiment is substantially similar to the transparent display device 1 shown in FIG. 1 except for a reflective plate 900. Thus, the elements shown in FIG. 5 that are substantially similar to those shown in FIG. 1 have the same reference numerals, and repeated descriptions of substantially similar elements are abbreviated or omitted. In addition, a method of using the transparent display device 4 according to the present exemplary embodiment is substantially similar to the method of FIG. 2, and repeated descriptions are abbreviated or omitted.

The transparent display device 4 includes an LCD module 10, the reflective plate 900, and a transparent reflector 700. The LCD module 10 is substantially similar to the LCD module 10 shown in FIG. 1. The transparent reflector 700 and the LCD module 10 are spaced apart. The LCD module 10 may further include an optical sheet (not shown) that concentrates the light in a certain direction. In addition, the transparent reflector 700 may further include a reflective film (not shown) formed on the surface of the transparent reflector 700 opposite to the other surface on which the image is displayed.

The reflective plate 900 is spaced apart from the LCD module 10 and is disposed between the LCD module 10 and the transparent reflector 700. The reflective plate 900 reflects light from the LCD module 10 onto the transparent reflector 700. Although not shown in the figure, the transparent display device 4 may include more than two reflective plates.

The reflective plate 900 may be positioned in a range of distances from the LCD module 10. In addition, the reflective plate 900 is disposed so that an incidence angle i2 of the light incident to the reflective plate 900 from the LCD module 10 is more than about 0° but less than about 90°. For example, the incidence angle i2 may be more than about 10° but less than about 80°. Particularly, when the incidence angle i2 is at Brewster's angle, the brightest image may be displayed, that is, $i2=\tan^{-1} \eta$, where $\eta$ is the refractive index of the medium of the reflective plate 900 with the refractive index of air approximated as one.

An angle of the reflective plate 900 may be controlled according to the incidence angle i2 of the light or a disposition of the transparent reflector 700.

The reflective plate 900 may include a reflective film (not shown) formed on a reflective surface of the reflective plate 900. The reflective film may be attached to the reflective surface of the reflective plate 900 or may be formed on the reflective surface of the reflective plate 900 by coating a reflective material.

According to the present exemplary embodiment, the transparent display device 4 includes one or more than two reflective plates so that the transparent display device 4 may be freely disposed according to a space.

Figure 6:
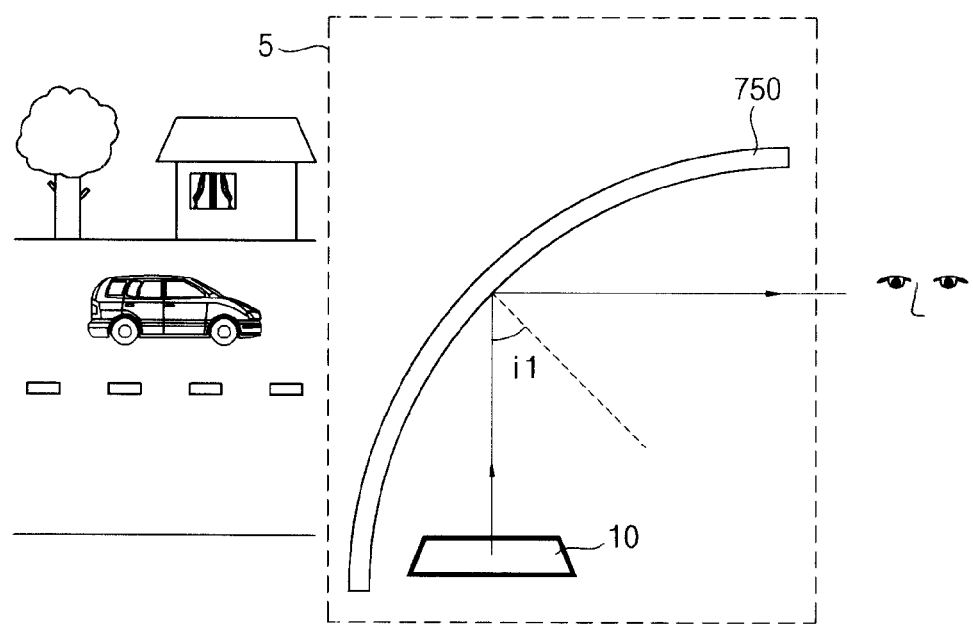
FIG. 6 is a cross-sectional view of a transparent display device according to another exemplary embodiment of the present invention.

FIG. 6 is a cross-sectional view of a transparent display device according to another exemplary embodiment of the present invention.

Referring to FIG. 6, the transparent display device 5 according to the present exemplary embodiment is substantially similar to the transparent display device 1 shown in FIG. 1 except for a transparent reflector 750. That is, the transparent display device 5 according to the present exemplary embodiment includes the transparent reflector 750 instead of the transparent reflector 700 of the transparent display device 1 shown in FIG. 1. Thus, elements shown in FIG. 6 that are substantially similar to those shown in FIG. 1 have the same reference numerals, and repeated descriptions thereof are abbreviated or omitted. In addition, a method using the transparent display device 5 according to the present exemplary embodiment is substantially similar to the method of FIG. 2, and repeated descriptions thereof are abbreviated or omitted.

The transparent display device 5 includes an LCD module 10 and a transparent reflector 750 having a curved shape. The LCD module 10 is substantially similar to the LCD module 10 shown in FIG. 1. The transparent reflector 750 and the LCD module 10 are spaced apart. The LCD module 10 may further include an optical sheet (not shown) that concentrates light into a certain direction.

The transparent reflector 750 may have a curved shape with a constant curvature. When the transparent reflector 750 has a curved shape, the image provided from the LCD module 10 may be diminishingly or expansively displayed on the transparent reflector 750.

The transparent reflector 750 may have a concave shape with respect to the LCD module 10. Although not shown in the figure, the transparent reflector 750 may have a convex shape with respect to the LCD module 10. For example, when the transparent reflector 750 has the concave shape with respect to the LCD module 10, the image may be enlarged. In contrast, when the transparent reflector 750 has a convex shape with respect to the LCD module 10, the image may be reduced.

An incidence angle i1 of light incident to the transparent reflector 750 from the LCD module 10 may be greater than about 0° but less than about 90°. For example, the incidence angle i1 may be more than about 10° but less than about 80°. Particularly, when the incidence angle i1 is equal to Brewster's angle the greatest intensity image may be displayed, that is, $i1 = \tan^{-1} \eta$.

The transparency of the transparent reflector 750 may be controlled according to a luminance of the light source 500 or a grayscale of the image. The LCD module 10 may further include a control part (not shown) that detects an intensity of an external light and controls the transparency of the transparent reflector 750 based on the detected intensity of the external light.

The transparent reflector 750 inversely displays the image in left-and-right or up-and-down directions, and thus the control part may compensate a distortion of the image due to image inversion. Further, the control part may provide an inverse image of the image displayed on the transparent reflector 750 to the LCD module 10. Furthermore, the control part may compensate the distortion of the image due to an expansion or a reduction of the image.

The transparent display device 5 may further include a reflective plate (not shown) that is disposed between the LCD module 10 and the transparent reflector 750 and provides the light to the transparent reflector 750 by reflecting the light provided from the LCD module 10 onto the transparent reflector 750. In addition, a reflective film (not shown) may be formed on a surface of the transparent reflector 750 opposite to the surface on which the image is displayed.

According to the present exemplary embodiment, the transparent reflector 750 has a curved shape so the image provided from the LCD module 10 may be expanded or reduced.

In exemplary embodiments of the present invention, the transparent display device uses an LCD module as an image source so manufacturing production is not impacted. In addition, an exit-side polarizing plate of the LCD module is removed to reduce manufacturing cost.

Further, the image is not displayed on the LCD panel so a transparent display may be dramatic. Furthermore, the transparent reflector displaying the image does not need a bezel so space usage and design freedom may be improved. Therefore, the transparent display device may be applied to various fields that may benefit from a transparent display such as a stage, a store, an office, a vehicle, public transportation, a cellular phone, and a personal digital assistant.

The foregoing is illustrative and should not be construed as limiting the present invention. Although exemplary embodiments of the present invention have been described, it will be apparent to those skilled in the art that various modifications and variations can be made to the present invention without departing from the spirit or scope of the invention. Thus, it is intended that the present invention covers the modifications and variations provided they come within the scope of the appended claims and their equivalents.

What is claimed is:

1. A display device, comprising:
a liquid crystal display (LCD) module, comprising:
an LCD panel comprising a liquid crystal layer;
a light source to provide light to the LCD panel; and
a polarizing plate disposed between the light source and the LCD panel to polarize the light from the light source;
a reflector spaced apart from the LCD module and configured to reflect an image provided from the LCD panel, and
a control part to control the transparency of the reflector by controlling a luminance of the light source or a grayscale of the image based on an intensity of an external light.

2. The display device of claim 1, wherein the control part is configured to change the transparency of the reflector between a first state and a second state;
wherein in the first state the background objects behind the reflector are visible; and
wherein in the second state the background objects behind the reflector are not visible.

3. The display device of claim 1, wherein the reflector has a curved shape.

4. The display device of claim 1, wherein the reflector comprises a transparent material having a refractive index greater than about 1.

5. The display device of claim 4, wherein the reflector comprises at least one material selected from the group consisting of glass, acrylic, and polycarbonate.

6. The display device of claim 4, wherein an incidence angle of the light incident on the reflector from the LCD module is equal to Brewster's angle.

7. The display device of claim 1, further comprising a reflective film disposed on a surface of the reflector opposite to a surface on which the image is displayed.

8. The display device of claim 1, further comprising at least one reflective plate disposed between the LCD module and the reflector, the at least one reflective plate configured to reflect the image provided from the LCD panel to provide the reflected image to the reflector.

9. The display device of claim 1, further comprising an optical sheet disposed on at least one surface of the LCD panel and configured to concentrate light toward the reflector.

10. A display device, comprising:
a liquid crystal display (LCD) module comprising:
an LCD panel comprising a liquid crystal layer;
a light source to provide light to the LCD panel; and
a polarizing plate disposed between the light source and the LCD panel to polarize the light;
a reflector spaced apart from the LCD module and configured to reflect an image provided from the LCD panel, and
a control part to control the transparency of the reflector by controlling a luminance of the light source or a grayscale of the image based on an intensity of an external light;
wherein the reflector has a curved shape.

11. The display device of claim 10, wherein the reflector has a concave shape with respect to the LCD module.

12. The display device of claim 10, wherein the reflector has a convex shape with respect to the LCD module.

13. The display device of claim 10, wherein the reflector comprises a transparent material having a refractive index greater than about 1.

14. The display device of claim 13, wherein the reflector comprises at least one material selected from the group consisting of glass, acrylic, and polycarbonate.

15. The display device of claim 13, wherein an incidence angle of the light incident on the reflector from the LCD module is equal to Brewster's angle.

16. A method for displaying an image, the method comprising:
providing polarized light to a liquid crystal display (LCD) panel; and
displaying an image provided from the LCD panel by reflecting the image from a transparent reflector spaced apart from the LCD panel; and
using a control part to control the transparency of the transparent reflector based on an intensity of an external light.

17. The method of claim 16, wherein the transparent reflector has a curved shape.

18. The method of claim 16, further comprising controlling the transparency of the transparent reflector by controlling a luminance of the light source or a grayscale of the image.

19. The method of claim 16, further comprising compensating a distortion of the reflected image.

20. An image display apparatus, comprising:
an image display device; and
a reflector spaced apart from the image display device and configured to polarize and reflect light transmitted from the image display device to display an image; and
a control part to control the transparency of the reflector by controlling a luminance of the light source or a grayscale of the image based on an intensity of an external light.

21. The image display apparatus of claim 20, further comprising:
a light source configured to provide light to the image display device; and
a polarizer disposed between the light source and the image display device, the polarizer configured to polarize the light from the light source.

22. The display device of claim 21, wherein the reflector has a convex shape or concave shape with respect to an emitting surface of the image display device.

* * * * *